United States Patent
Chang et al.

(10) Patent No.: US 11,385,906 B2
(45) Date of Patent: Jul. 12, 2022

(54) COMPUTER PROGRAM PRODUCT AND METHOD AND APPARATUS FOR CONTROLLING ACCESS TO FLASH STORAGE

(71) Applicant: SILICON MOTION, INC., Zhubei (TW)

(72) Inventors: Chun-Chieh Chang, Taipei (TW); Hsing-Lang Huang, Zhubei (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 17/150,244

(22) Filed: Jan. 15, 2021

(65) Prior Publication Data

US 2021/0318890 A1 Oct. 14, 2021

Related U.S. Application Data

(60) Provisional application No. 63/009,128, filed on Apr. 13, 2020.

(30) Foreign Application Priority Data

Jun. 3, 2020 (CN) .......................... 202010496601.1

(51) Int. Cl.
*G06F 9/4401* (2018.01)
*G06F 3/06* (2006.01)
(Continued)

(52) U.S. Cl.
CPC .......... *G06F 9/4418* (2013.01); *G06F 3/0625* (2013.01); *G06F 3/0659* (2013.01);
(Continued)

(58) Field of Classification Search
CPC .... G06F 3/0625; G06F 3/0659; G06F 3/0679; G06F 9/4418; G06F 13/1668; G06F 13/4027
See application file for complete search history.

(56) References Cited

U.S. PATENT DOCUMENTS 7,596,707 B1 * 9/2009 Vemula ................. G06F 1/3275
713/320
2013/0159608 A1 6/2013 Shin
(Continued)

FOREIGN PATENT DOCUMENTS

TW 201327561 A1 7/2013
TW I512623 B 12/2015

OTHER PUBLICATIONS

Taiwanese Search Report for Taiwanese Application No. 109118541, dated Aug. 17, 2021.

*Primary Examiner* — Nimesh G Patel
(74) *Attorney, Agent, or Firm* — Birch, Stewart, Kolasch & Birch, LLP (57) ABSTRACT

The invention is related to a non-transitory computer program product, a method and an apparatus for controlling access to a flash storage. The method, performed by a processing unit of a bridge integrate circuit (IC), includes: receiving a host write command from a host side; determining whether the flash storage needs to enter a hibernate state based on at least information regarding a length of data that has been programmed into the flash storage and/or a quantity of host write commands that have been executed after executing the host write command; and instructing the flash storage to enter the hibernate state when the length of data and/or the quantity of host write command meets a triggering condition.

17 Claims, 6 Drawing Sheets

(51) Int. Cl.
*G06F 13/16* (2006.01)
*G06F 13/40* (2006.01)

(52) U.S. Cl.
CPC ........ *G06F 3/0679* (2013.01); *G06F 13/1668* (2013.01); *G06F 13/4027* (2013.01)

(56) References Cited

U.S. PATENT DOCUMENTS

| | | | |
|---|---|---|---|
| 2013/0166864 A1* | 6/2013 | Yerushalmi | G06F 3/0679 |
| | | | 711/162 |
| 2014/0191327 A1 | 6/2014 | Cohen et al. | |
| 2015/0286585 A1* | 10/2015 | Caraccio | G06F 12/1458 |
| | | | 713/189 |
| 2016/0320995 A1* | 11/2016 | Warriner | G06F 3/0679 |
| 2017/0336976 A1* | 11/2017 | Lesartre | G06F 21/79 |
| 2018/0360464 A1 | 12/2018 | Irvine | |
| 2019/0050153 A1* | 2/2019 | Yang | G06F 1/206 |
| 2019/0317672 A1* | 10/2019 | Linnen | G06F 1/206 |

* cited by examiner

COMPUTER PROGRAM PRODUCT AND METHOD AND APPARATUS FOR CONTROLLING ACCESS TO FLASH STORAGE

CROSS-REFERENCE TO RELATED APPLICATIONS

This application claims the benefit of priority to U.S. Provisional Application Ser. No. 63/009,128, filed on Apr. 13, 2020; and Patent Application No. 202010496601.1, filed in China on Jun. 3, 2020; the entirety of which is incorporated herein by reference for all purposes.

BACKGROUND

The disclosure generally relates to storage devices and, more particularly, to a computer program product, a method and an apparatus for controlling access to a flash storage.

A Universal Serial Bus (USB) memory drive is a data storage device that includes flash memory with an integrated USB interface. It is typically removable, rewritable and small. Its storage capacity may be from 16 gigabytes (GB) to 1 terabytes (TB). USB memory drives are often used for storage, data back-up and transfer of computer files, or others. However, with increased speed of data access to flash memory, the temperature of USB memory drive may go high beyond a tolerable operating condition, resulting in unexpected errors that are occurred in executions of the read/write commands. Thus, it is desirable to have a computer program product, a method, and an apparatus for controlling access to a flash storage.

SUMMARY

In an aspect of the invention, an embodiment introduces a non-transitory computer program product for controlling access to a flash storage when executed by a processing unit of a bridge integrate circuit (IC). The non-transitory computer program product includes program code to: receive a host write command from a host side; determine whether the flash storage needs to enter a hibernate state based on at least information regarding a length of data that has been programmed into the flash storage and/or a quantity of host write commands that have been executed after executing the host write command; and instruct the flash storage to enter the hibernate state when the length of data and/or the quantity of host write command meets a triggering condition.

In another aspect of the invention, an embodiment introduces a method for controlling access to a flash storage, performed by a processing unit of a bridge IC, includes: receiving a host write command from a host side; determining whether the flash storage needs to enter a hibernate state based on at least information regarding a length of data that has been programmed into the flash storage and/or a quantity of host write commands that have been executed after executing the host write command; and instructing the flash storage to enter the hibernate state when the length of data and/or the quantity of host write command meets a triggering condition.

In still another aspect of the invention, an embodiment introduces an apparatus for controlling access to a flash storage to include a host interface (I/F), coupled to a host side; a device I/F, coupled to the flash storage; and a processing unit. The processing unit is arranged operably to receive a host write command from the host side; determine whether the flash storage needs to enter a hibernate state based on at least information regarding a length of data that has been programmed into the flash storage and/or a quantity of host write commands that have been executed after executing the host write command; and instruct the flash storage to enter the hibernate state when the length of data and/or the quantity of host write command meets a triggering condition.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first," "second," "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

Figure 1:
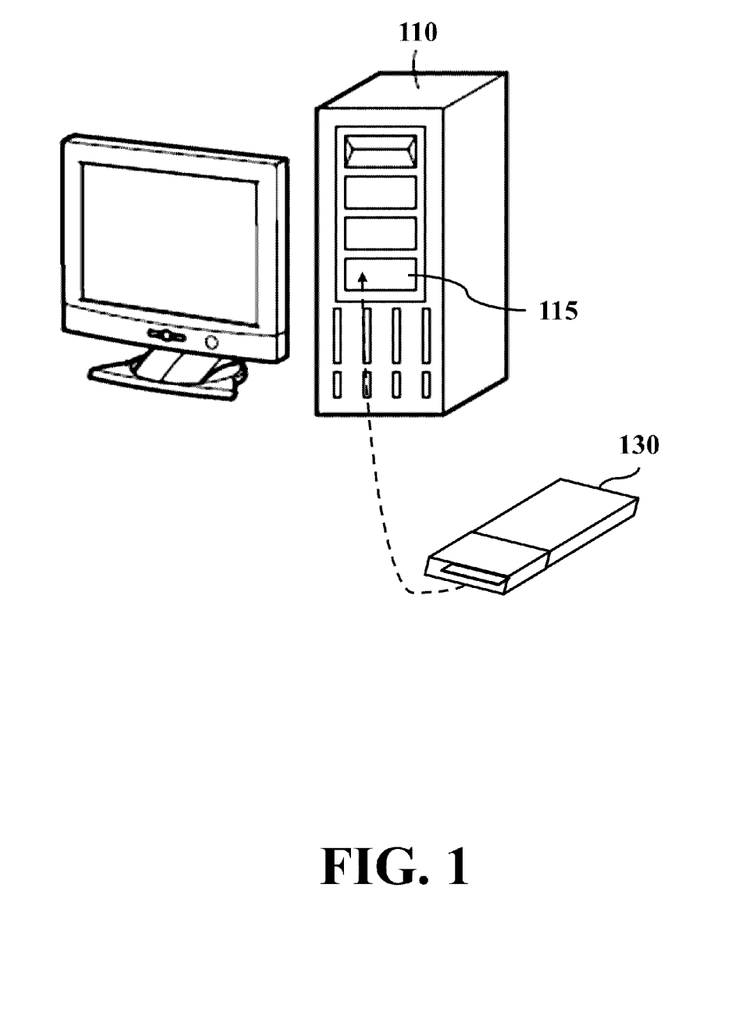
FIG. 1 is a schematic diagram of the use of a universal serial bus (USB) memory drive according to an embodiment of the invention.

Refer to FIG. 1. After inserting the Universal Serial Bus (USB) memory drive 130 into the USB port 115 of the computer host 110, a user may back up data from a storage device in the computer host 110 to the USB memory drive 130, copy data in the USB memory drive 130 and store the copied one in the storage device in the computer host 110, or perform other data access operations. The USB memory drive 130 includes a high-volume NAND flash memory card from 16 gigabytes (GB) to 1 terabytes (TB). As the access speed increases, the NAND flash memory card tends to heat up during data access. However, for the convenience of portability, the USB memory drive 130 is manufactured to be as small as possible, which makes it difficult to dissipate heat. As a result, it may cause the NAND flash memory card to produce unexpected errors in data access due to excessively high temperature, or even make the NAND flash memory card malfunction. Since the NAND flash memory card malfunctions, the computer host 110 would mistakenly consider that the USB memory drive 130 is broken due to the lack of a response from the USB memory drive 130 during data access. Although embodiments of the invention describe the USB interface to connect the computer host 110 as an example, those skilled in the art may apply the invention to another memory drive equipped with a different interface, such as IEEE1394, etc., to connect to the computer host 110, and the invention should not be limited thereto. In other embodiments, those artisans may alternatively implement the computer host 110 as other electronic product, such as a laptop computer, a tablet computer, a mobile phone, a digital camera, a digital recorder, etc., and the invention should not be limited thereto.

To address the problems described above, in some implementations, the USB memory drive 130 is equipped with a temperature sensor integrate circuit (IC) to detect temperatures in the USB memory drive 130 during data access. An operation is performed to avoid failure of the NAND flash memory card when the temperature exceeds a threshold.

However, adding the temperature sensor IC would increase the cost of the USB memory drives. Therefore, an embodiment of the invention introduces a technical solution, which is applied to a USB memory drive without a temperature sensor IC. Since the data write operations require a lot of power and the temperature of the USB memory drive 130 would rise, the embodiment of the invention monitors the data write operations that have been performed in the past, and performs an operation to avoid the NAND flash card or memory failure when the monitored data write operations have reached a preset condition.

Figure 2A:
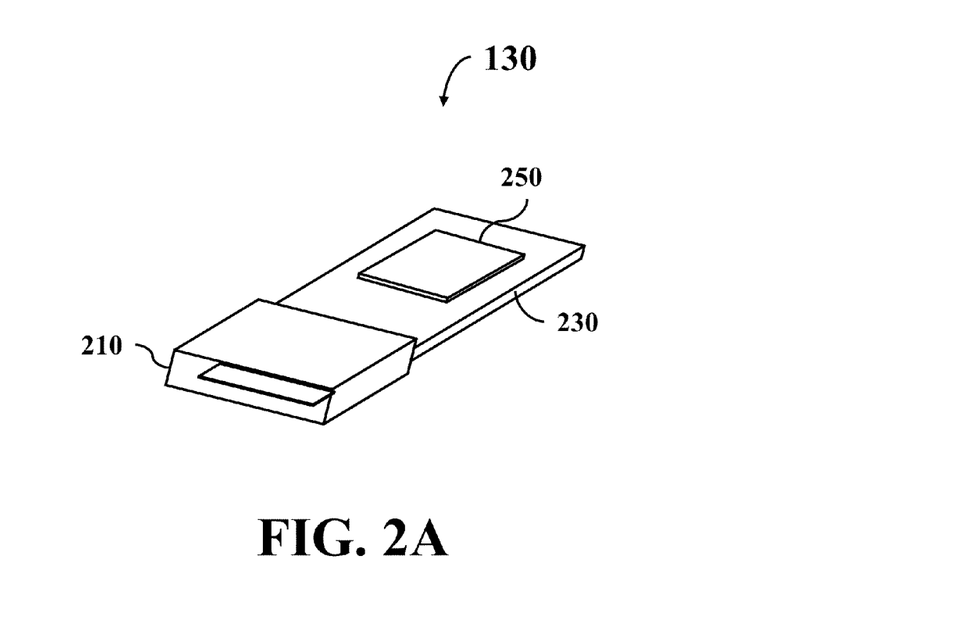
FIGS. 2A and 2B are schematic diagrams of the appearance of a USB memory drive according to an embodiment of the invention.
Figure 2B:
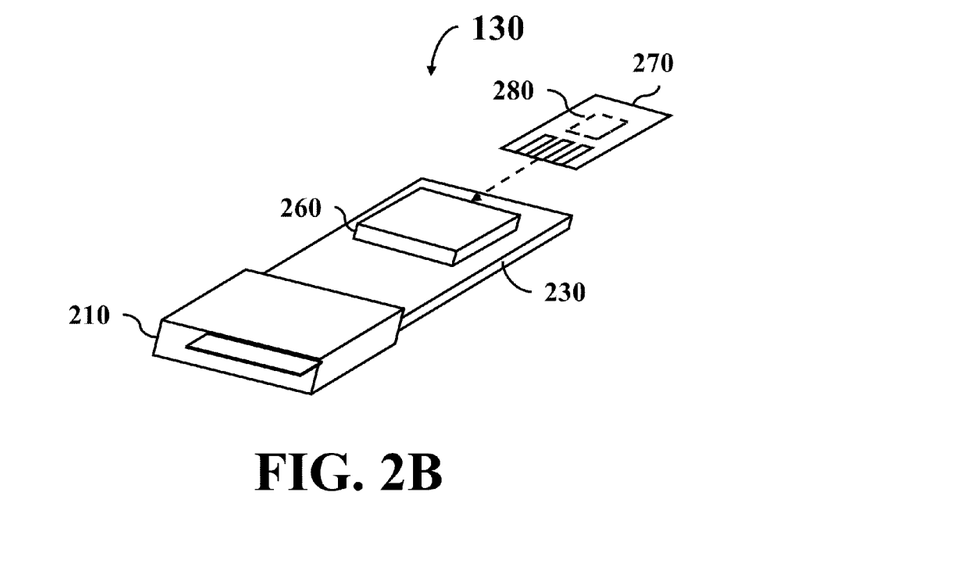

Refer to FIG. 2A. In some embodiments, the USB memory drive 130 includes the USB connector 210 and the rectangular motherboard 230. One end of the motherboard 230 is connected to the USB connector 210. The bridge IC 250 is disposed on one side of the motherboard 230, and the bridge IC 250 is coupled to the USB connector 210 through a circuit of the motherboard 230. Refer to FIG. 2B. The card slot 260 is disposed on the other side of the motherboard 230. The flash memory card 270 can be inserted into the card slot 260 and coupled to the bridge IC 250 through a circuit of the motherboard 230. The flash memory card 270 includes the flash controller 280 and a flash module. Generally, when the size of the motherboard 230 is less than 3 centimeter (cm) by 2 cm, heat dissipation would be difficult.

Figure 3:
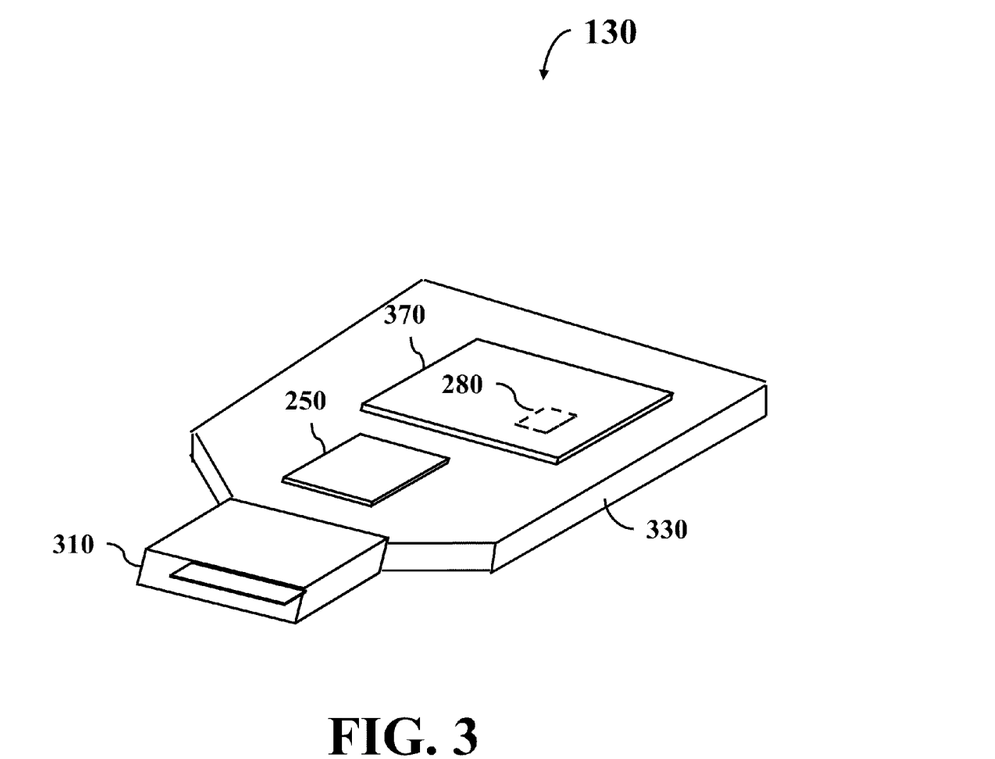
FIG. 3 is a schematic diagram of the appearance of a USB memory drive according to an embodiment of the invention.

Refer to FIG. 3. The USB memory drive 130 includes the USB connector 310 and a rectangular motherboard 330 with two corners cut off on the same end. The narrow end of the motherboard 330 is connected to the USB connector 310. The bridge IC 250 and the flash memory 370 are disposed on one side of the motherboard 330, and the bridge IC 250 is coupled to the USB connector 210 and the flash memory 370 through circuits of the motherboard 330. The flash memory 370 is packaged by the Ball Grid Array (BGA) and includes the flash controller 280 and a flash module.

The flash memory card 270 and the flash memory 370 may be referred to as flash storages collectively. Other types of NAND flash memory can be configured in the USB memory drive 130 as a flash storage and the invention should not be limited thereto.

Figure 4:
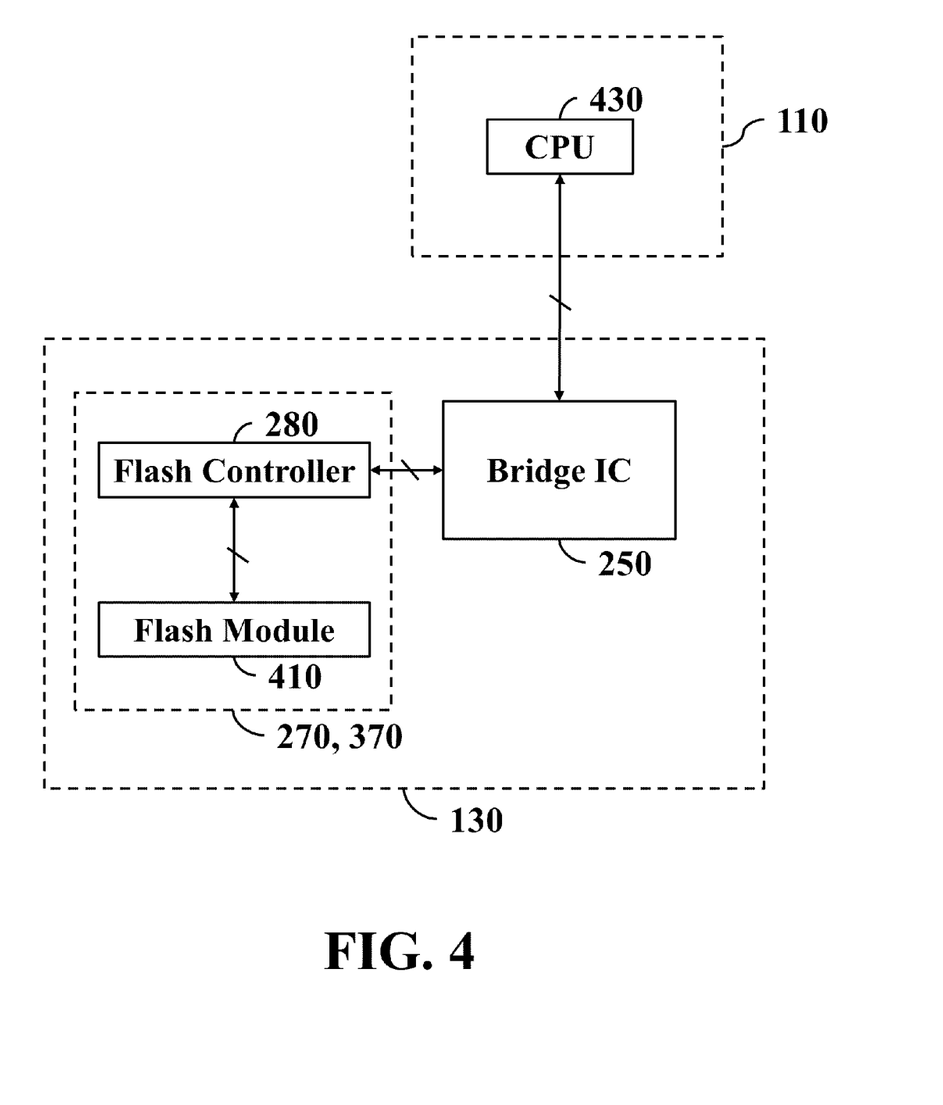
FIG. 4 is a block diagram showing a host side and a USB memory drive according to an embodiment of the invention.

Refer to FIG. 4. The computer host (hereinafter referred to as the host side) 110 includes the central processing unit (CPU) 430, and the USB memory drive (hereinafter referred to as the memory drive) 130 includes the bridge IC 250. The flash memory card 270 or the flash memory 370 includes the flash controller 280 and the flash module 410. On the one hand, the bridge IC 250 plays the role of the device side for the CPU 430, and communicates with the CPU 430 through the USB communications protocol. On the other hand, the bridge IC 250 plays the role of the host side for the flash memory card 270 or the flash memory 370, and communicates with the flash controller 280 through a communications protocol, such as Peripheral Component Interconnect Express (PCI-E), Universal Flash Storage (UFS), Embedded Multi-Media Card (eMMC) protocol, or others. The flash controller 280 and the flash module 410 may communicate with each other by a Double Data Rate (DDR) protocol, such as Open NAND Flash Interface (ONFI), DDR Toggle, or others. The CPU 430 may be implemented in numerous ways, such as with general-purpose hardware (e.g., a single processor, multiple processors or graphics processing units capable of parallel computations, or others) that is programmed using firmware and/or software instructions to perform the functions recited herein.

Figure 5:
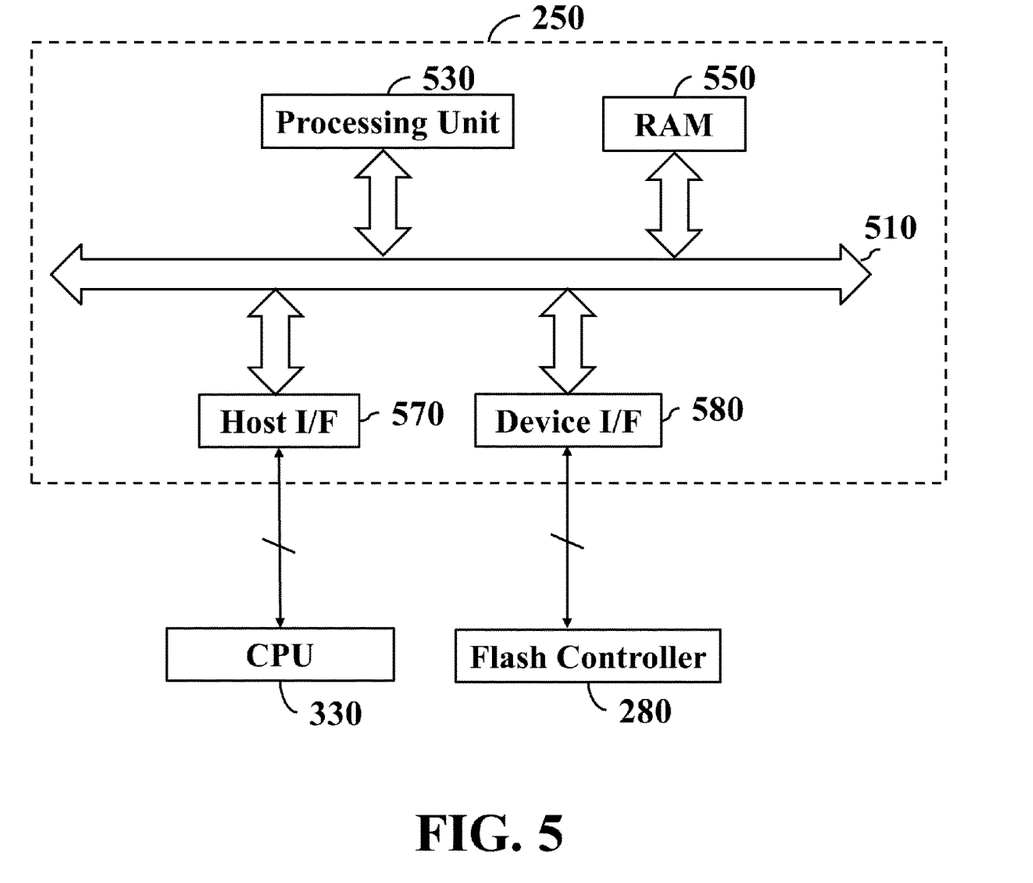
FIG. 5 is a block diagram showing a bridge integrate circuit (IC) with external components according to an embodiment of the invention.

Refer to FIG. 5. The bridge IC 250 includes the processing unit 530, the Random Access Memory (RAM) 550, the host interface (I/F) 570 and the device I/F 580, and the components 530, 550, 570 and 580 are coupled each other by the bus architecture 510. The bus architecture 510 is utilized between the components 530, 550, 570 and 580 to transfer data, addresses, control signals, etc. The processing unit 530 may be implemented in numerous ways, such as with general-purpose hardware a single processor, a micro control unit, multiple processors or graphics processing units capable of parallel computations, or others) that is programmed using firmware and/or software instructions to perform the functions recited herein. The processing unit 530 receives host commands, such as host read, write, trim, erase commands, through the host I/F 570, schedules and executes these commands. The RAM 550 may be implemented in a Dynamic Random Access Memory (DRAM), a Static Random Access Memory (SRAM), or the combination thereof, for allocating space as a data buffer storing user data (also referred to as host data) that is to be programmed into the flash memory card 270 or the flash memory 370, and has been read from the flash memory card 270 or the flash memory 370 and is to be output to the host side 110. The RAM 550 stores necessary data in execution, such as variables, data tables, data abstracts, and so on.

The flash module 410 provides huge storage space typically in hundred Gigabytes (GB), or even several Terabytes (TB), for storing a wide range of user data, such as high-resolution images, video files, etc. The flash module 410 includes control circuits and memory arrays containing memory cells that may be configured as Single Level Cells (SLCs), Multi-Level Cells (MLCs), Triple Level Cells (TLCs), Quad-Level Cells (QLCs), or any combinations thereof. The processing unit 530 communicates with the flash controller 280 through the device interface 580 to programs user data of a designated logical address and reads user data of a designated logical address, where the logical addresses may be represented by Logical Block Addresses (LBAs).

Figure 6:
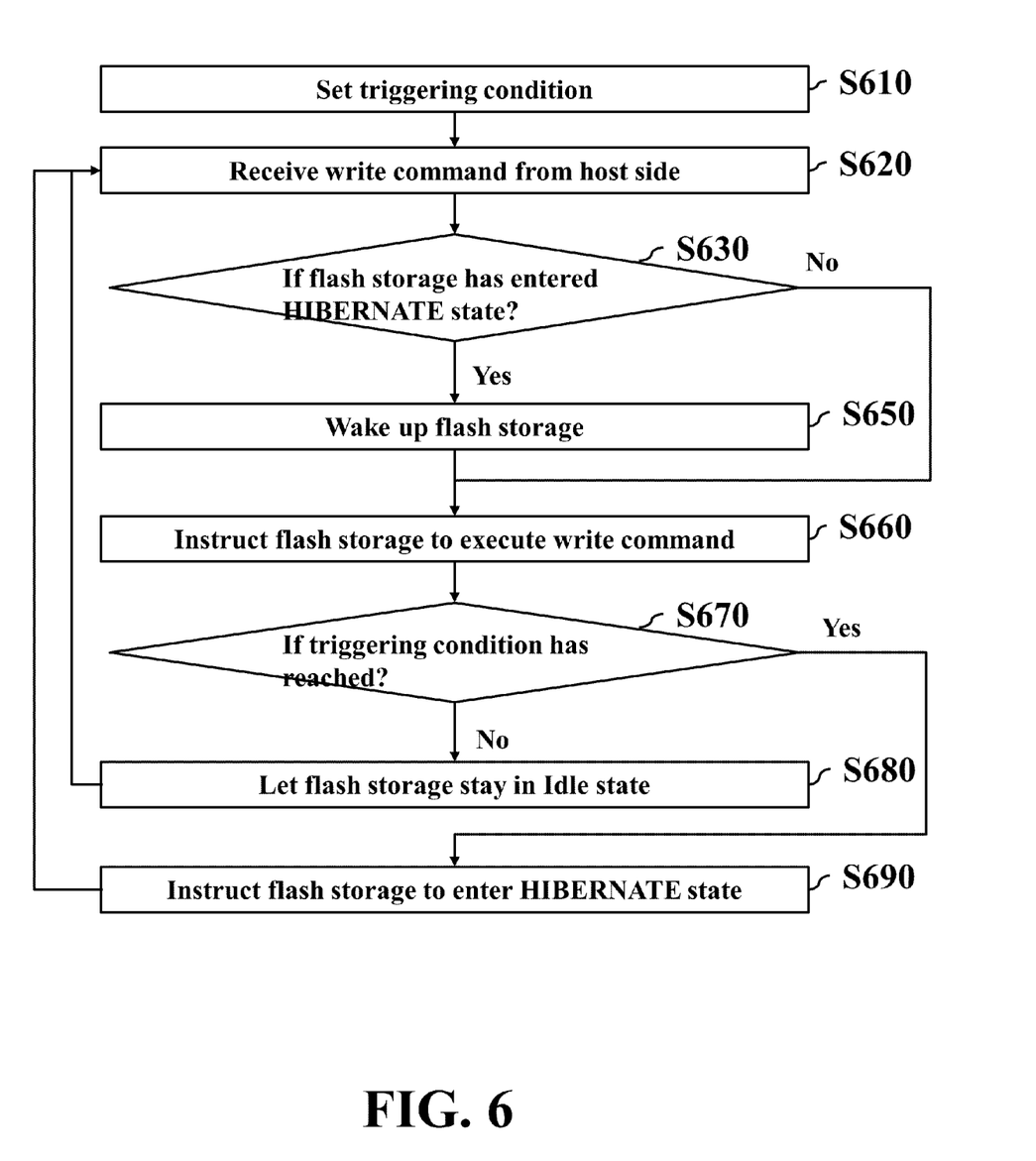
FIG. 6 is a flowchart illustrating a method for controlling access to a flash storage according to an embodiment of the invention.

To address the problems as described above, an embodiment of the invention introduces a method for controlling access to a flash storage, performed by the processing unit 530 when loading and executing relevant firmware or software instruction, so as to reduce the possibility of overheating of the flash storage when executing the host write commands. After one or more host write commands are executed, it is determined whether the flash storage needs to enter the HIBERNATE state based on at least information regarding a length of data that has been programmed into the flash storage and/or a quantity of host write commands that have been executed. When the above information meets a triggering condition, the flash storage is instructed to enter the HIBERNATE state, so that the flash storage could cool down and avoid a crash. After that, when the next command comes in, the flash storage is woken up. Using the USB memory drive 130 applying the inventive algorithms, users would not feel the difference, but it greatly reduces the risks of jamming due to over-heat. Refer to FIG. 6. Detailed steps are described as follows:

Step S610: A triggering condition about a data length that has been programmed and a quantity of host write commands that have been executed is set. Generally, the triggering condition could be set to indicate that the current host write command requests for programming data of "n"-K bytes or greater, and "m" host write commands requesting for programming data of "n"-K bytes or greater have been processed cumulatively, where "m" and "n" are integers greater than zero. The variables "n" and "m" could be modified to reflect the capacity of flash storage or the size of the USB memory drive 130. In some embodiments, the variable "n" is set to 96 and the variable "m" is set to an arbitrary integer ranging from 4 to 7. In alternative embodiments, the variable "n" is set to 32 and the variable "m" is set to an arbitrary integer ranging from 15 to 25. The processing unit 530 may store the variables "n" and "m" in the RAM 550 as default values. Moreover, the processing unit 530 may maintain a counter "cmd_count", which is initialized to zero, in the RAM 550 to record that how many host write commands requesting for programming data of "n"-k bytes or greater have been processed cumulatively.

Step S620: A write command (also referred to as a host write command) is received from the host side 110 through the host I/F 570.

Step S630: It is determined whether the flash storage has entered the HIBERNATE state. If so, the process proceeds to step S650. Otherwise, the process proceeds to step S660. The processing unit 530 may maintain a status flag in the RAM 550 to record information indicating whether the flash storage has entered the HIBERNATE state. For example, when the processing unit 530 instructs the flash controller 280 to put the flash storage into the HIBERNATE state through the device I/F 580, the status flag is set to "1". When the processing unit 530 instructs the flash controller 280 to wake up the flash storage through the device I/F 580, the status flag is set to "0". The processing unit 530 may detect the value of the status flag to complete the determination in step S630. It is to be noted that, when entering the S3/S4 state, the host side 110 instructs the flash storage to enter the HIBERNATE state through the bridge IC 250.

Step S650: The flash storage is woken up. The processing unit 530 may issue a series of instructions to the flash controller 280 through the device I/F 580 to request the flash storage to un-hibernate. For example, the technical details to un-hibernate may refer to the section 9.5.2 in the Specification for UniPro Version 1.8 published on Sep. 13, 2017. When the flash storage un-hibernates successfully, the processing unit 530 changes the status flag in the RAM 550 to "0".

Step S660: The flash storage is instructed to execute the write command. The processing unit 530 may issue an instruction to the flash controller 280 through the device I/F 580 to request for programming data of a designated LBA. If the length of the programmed data is equal to or greater than the "n"-k bytes, the processing unit 530 increases the counter value "cmd_count" in the RAM 550 by one.

Step S670: It is determined whether the triggering condition has reached. If so, process proceeds to step S690. Otherwise, the process proceeds to step S680. The processing unit 530 may detect whether the counter value "cmd_count" is equal to or greater than the variable value "m". When the counter value "cmd_count" is equal to or greater than the variable value "m", it means that the triggering condition has reached.

Step S680: Let the flash storage stay in the Idle state. The flash storage after executing the write command, in which no background operation needs to perform, automatically enters the Idle state and waits for the entry of the next command or the start of a background operation. In other words, in step S680, the processing unit 530 does not issue any instruction to the flash controller 280 through the device I/F 580, so that the flash storage can stay in the Idle state if no background operation needs to perform.

Step S690: The flash storage is instructed to enter the HIBERNATE state. The processing unit 530 may issue a series of instructions to the flash controller 280 through the device I/F 580 to request the flash storage to enter the HIBERNATE state. For example, the technical details to un-hibernate may refer to the section 9.5.1 in the Specification for UniPro Version 1.8 published on Sep. 13, 2017. When the flash storage has entered the HIBERNATE state, the processing unit 530 changes the status flag in the RAM 550 to "1". When the flash storage enters the HIBERNATE state, there will be less message exchanges between the bridge IC 250 and the flash controller 280 and between the flash controller 280 and the flash module 410, and the components in the flash controller 280 and the flash module 410 hardly work, so that the temperature of the USB memory drive 130 would fall. After the flash storage has entered the HIBERNATE state, the processing unit 530 may further reset the counter value "cmd_count" to 0 for re-accumulating the number of host write commands that have been processed.

Some or all of the aforementioned embodiments of the method of the invention may be implemented in a computer program such as a driver for a dedicated hardware, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 4 and 5, it should be noted that additional elements may be included to achieve better performance without departing from the spirit of the invention. Each element of FIGS. 4 and 5 is composed of various circuits and arranged operably to perform the aforementioned operations. While the process flows described in FIG. 6 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer readable medium for controlling access to a flash storage when executed by a processing unit of a bridge integrate circuit (IC), the non-transitory computer readable medium comprising program code to:

receive a host write command from a host side;

determine whether the flash storage needs to enter a hibernate state based on at least information regarding a length of data that has been programmed into the flash storage and/or a quantity of host write commands that have been executed after executing the host write command; and instruct the flash storage to enter the hibernate state when the length of data and/or the quantity of host write command meets a triggering condition, wherein the triggering condition indicates that the host write command requests for programming data of "n"-k bytes or greater, and "m" host write commands requesting for programming data of "n"-k bytes or greater have been processed cumulatively, where "m" and "n" are integers greater than zero.

2. The non-transitory computer readable medium of claim 1, wherein "n" is set to 96 and "m" is set to an integer ranging from 4 to 7.

3. The non-transitory computer readable medium of claim 1, wherein "n" is set to 32 and "m" is set to an integer ranging from 15 to 25.

4. The non-transitory computer readable medium of claim 1, wherein the bridge IC and the flash storage are disposed on a motherboard to form a memory drive.

5. The non-transitory computer readable medium of claim 4, wherein the flash storage is a flash memory card, and a size of the motherboard is less than 3 centimeter (cm) by 2 cm.

6. The non-transitory computer readable medium of claim 4, wherein the flash storage is packaged by a Ball Grid Array (BGA).

7. A method for controlling access to a flash storage, performed by a processing unit of a bridge integrate circuit (IC), comprising:

receiving a host write command from a host side;

determining whether the flash storage needs to enter a hibernate state based on at least information regarding a length of data that has been programmed into the flash storage and/or a quantity of host write commands that have been executed after executing the host write command; and instructing the flash storage to enter the hibernate state when the length of data and/or the quantity of host write command meets a triggering condition, wherein the triggering condition indicates that the host write command requests for programming data of "n"-k bytes or greater, and "m" host write commands requesting for programming data of "n"-k bytes or greater have been processed cumulatively, where "m" and "n" are integers greater than zero.

8. The method of claim 7, wherein "n" is set to 96 and "m" is set to an integer ranging from 4 to 7.

9. The method of claim 7, wherein "n" is set to 32 and "m" is set to an integer ranging from 15 to 25.

10. The method of claim 7, wherein the bridge IC and the flash storage are disposed on a motherboard to form a memory drive, the flash storage is a flash memory card, and a size of the motherboard is less than 3 centimeter (cm) by 2 cm.

11. The method of claim 7, wherein the bridge IC and the flash storage are disposed on a motherboard to form a memory drive, and the flash storage is packaged by a Ball Grid Array (BGA).

12. An apparatus for controlling access to a flash storage, comprising:

a host interface (I/F), coupled to a host side;

a device I/F, coupled to the flash storage; and a processing unit, coupled to the host I/F and the device I/F, arranged operably to receive a host write command from the host side; determine whether the flash storage needs to enter a hibernate state based on at least information regarding a length of data that has been programmed into the flash storage and/or a quantity of host write commands that have been executed after executing the host write command; and instruct the flash storage to enter the hibernate state when the length of data and/or the quantity of host write command meets a triggering condition, wherein the triggering condition indicates that the host write command requests for programming data of "n"-k bytes or greater, and "m" host write commands requesting for programming data of "n"-k bytes or greater have been processed cumulatively, where "m" and "n" are integers greater than zero.

13. The apparatus of claim 12, wherein "n" is set to 96 and "m" is set to an integer ranging from 4 to 7.

14. The apparatus of claim 12, wherein "n" is set to 32 and "m" is set to an integer ranging from 15 to 25.

15. The apparatus of claim 12, wherein the apparatus and the flash storage are disposed on a motherboard to form a memory drive.

16. The apparatus of claim 15, wherein the flash storage is a flash memory card, and a size of the motherboard is less than 3 centimeter (cm) by 2 cm.

17. The apparatus of claim 15, wherein flash storage is packaged by a Ball Grid Array (BGA).

* * * * *